United States Patent
Yamada

(10) Patent No.: US 9,374,016 B2
(45) Date of Patent: Jun. 21, 2016

(54) AC-DC CONVERTER

(71) Applicant: Fuji Electric Co., Ltd., Kanagawa (JP)

(72) Inventor: Ryuji Yamada, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 14/715,431

(22) Filed: May 18, 2015

(65) Prior Publication Data

US 2015/0372614 A1    Dec. 24, 2015

(30) Foreign Application Priority Data

Jun. 24, 2014   (JP) ................. 2014-129026

(51) Int. Cl.
| | | |
|---|---|---|
| *H02J 1/10* | (2006.01) | |
| *H02M 7/08* | (2006.01) | |
| *H02M 7/162* | (2006.01) | |
| *H02M 7/155* | (2006.01) | |
| *G05F 1/62* | (2006.01) | |
| *G05F 1/52* | (2006.01) | |
| *G01R 19/00* | (2006.01) | |
| *H02M 7/06* | (2006.01) | |
| *H02M 3/156* | (2006.01) | |
| *H02M 7/10* | (2006.01) | |
| *H02M 1/00* | (2006.01) | |

(52) U.S. Cl.
CPC ............... *H02M 7/06* (2013.01); *H02M 3/156* (2013.01); *H02M 7/10* (2013.01); *H02M 2001/007* (2013.01); *H02M 2001/0074* (2013.01)

(58) Field of Classification Search
CPC .................. H02M 2001/0074; H02J 1/102
USPC ............. 363/65, 67, 72, 84, 87, 88, 89, 125, 363/126, 127, 128, 129; 307/5, 6, 54, 63, 307/77; 323/222–225
See application file for complete search history.

(56) References Cited

U.S. PATENT DOCUMENTS

| | | | | |
|---|---|---|---|---|
| 2003/0202367 A1* | 10/2003 | Schreiber | .............. | H02M 5/458 363/72 |
| 2008/0304300 A1* | 12/2008 | Raju | ..................... | H02M 7/217 363/126 |

(Continued)

FOREIGN PATENT DOCUMENTS

| | | | | |
|---|---|---|---|---|
| FR | WO 2013124595 A2 * | 8/2013 | .............. | H02M 1/36 |
| JP | H10-155282 A | 6/1998 | | |

(Continued)

*Primary Examiner* — Timothy J Dole
*Assistant Examiner* — Sisay G Tiku
(74) *Attorney, Agent, or Firm* — Chen Yoshimura LLP

(57) ABSTRACT

An AC to DC converter is provided with: a rectifier circuit that rectifies an AC voltage generated by an AC voltage source; and a plurality of switching units that collectively receive an output voltage of the rectifier circuit through an inductor, and that are connected in series at an input side, each of the switching units having a semiconductor switching device, a diode, and a capacitor, and performing ON/OFF switching of the semiconductor switching device provided therein to step up a voltage received from the rectifier circuit, each of the switching units supplying the stepped-up voltage to the capacitor through the diode so that a resulting DC across the capacitor can be provided, as a DC output voltage of the switching unit, to a respective load to be connected to terminals of the capacitor.

9 Claims, 13 Drawing Sheets

(56) References Cited

U.S. PATENT DOCUMENTS

| | | | |
|---|---|---|---|
| 2012/0212984 A1* | 8/2012 | Yamada | H02M 7/219 363/89 |
| 2013/0003431 A1* | 1/2013 | Reddy | H02M 3/285 363/126 |
| 2015/0029761 A1* | 1/2015 | Trinh | H02M 1/36 363/17 |
| 2015/0207426 A1* | 7/2015 | Santini | H02M 7/06 363/126 |

FOREIGN PATENT DOCUMENTS

| | | |
|---|---|---|
| JP | 2012-044839 A | 3/2012 |
| JP | 2014-018028 A | 1/2014 |

\* cited by examiner

AC-DC CONVERTER

BACKGROUND OF THE INVENTION

1. Technical Field

The present invention relates to AC-DC converters.

2. Background Art

FIG. 10 is a circuit diagram of a conventional AC-DC converter, a circuit well known as a PFC (Power Factor Correction) circuit.

In FIG. 10, 1 is an AC power source; 2 to 5 are diodes constituting a rectifier circuit (diode bridge) DB; 6 is an inductor; 7 is a semiconductor switching device; 8 is a diode; 9 is a capacitor; and 10 is a load. The portion constituted by the inductor 6, the switching device 7, the diode 8, and the capacitor 9 is also known as a so-called boost converter, which boosts a DC voltage to increase output. Other than the MOSFET (Metal Oxide Silicon Field Effect Transistor) shown here in the diagram, an IGBT (Isolated Gate Bipolar Transistor), a BJT (Bipolar Junction Transistor), or the like may also be used for the switching device 7.

Note that in FIG. 10, $V_{in}$ is an AC input voltage; is an AC input current; $I_L$ is a current flowing through the inductor 6; $V_{r1}$ is an output voltage of the rectifier circuit DB; $V_{r2}$ is a drain-source voltage of the switching device 7; and E is a DC output voltage (terminal voltage across the capacitor 9).

Functions of the circuit shown in FIG. 10 are as follows:

(1) To convert the AC input voltage $V_{in}$ into a DC output voltage E of a desired voltage and to keep the DC output voltage E constant regardless of fluctuations in the AC input voltage $V_{in}$ and load current.

(2) To make the AC input current $I_{in}$ a sinusoidal wave with a power factor of approximately 1.

Operations for achieving the aforementioned functions (1) and (2) will be described with reference to FIGS. 10 to 12. Note that the forward voltage drops of the diodes 2 to 5 and 8 and the switching device 7 will be disregarded in the descriptions below.

If the AC input voltage $V_{in}$ at present is assumed to be a sinusoidal wave such as the one shown in FIG. 12, the voltage $V_{r1}$ outputted by the diode bridge DB becomes a fully rectified waveform.

When the AC input voltage $V_{in}$ has positive polarity and the switching device 7 in FIG. 10 is turned on, the voltage $V_{r2}$ becomes 0V and the current flows in the following path: AC power source 1→diode 2→inductor 6→switching device 7→diode 5→AC power source 1. As a result of this, the voltage $V_{in}$ is applied to both ends of the inductor 6, and the current $I_L$ increases. Meanwhile, when the switching device 7 is turned off, the current $I_{in}$ flows in the following path: AC power source 1→diode 2→inductor 6→diode 8→capacitor 9→diode 5→AC power source 1. At this time, the voltage $V_{r2}$ is nearly equal to the terminal voltage E across the capacitor 9, and a voltage that is a difference between the voltage E and the AC input voltage $V_{in}$ is applied to the inductor 6. Note the circuit operates so as to keep the voltage E higher than the peak value of the AC input voltage $V_{in}$. As a result, the $I_L$ decreases.

It follows that, by controlling the on-off time ratio of the switching device 7, it is possible to control the waveform and the size of the current $I_L$ in any manner. If the current $I_L$ is set to be a rectified sinusoidal waveform similar to that of the voltage $V_{r1}$ (here, the ripple is disregarded), the AC input current becomes a sinusoidal waveform. Additionally, by controlling the amplitude of the current $I_L$ according to load power, it is possible to maintain the DC output voltage E to a desired constant value.

FIG. 11 is a block diagram of a control circuit for controlling the on-off time ratio of the switching device 7. In FIGS. 11, 102 to 105 are adders; 106 is an absolute value calculator; 107 is a voltage regulator (AVR); 108 is a multiplier; 109 is a current regulator (ACR); 111 is a comparator; 112 is a logic inverter; and 113 is a carrier generator that produces triangle waves.

The control circuit operates as follows:

The control circuit detects the DC output voltage E in FIG. 10 using a known voltage detector, obtains a deviation of the voltage E from a command value E* using the adder 102, and inputs the obtained deviation into the voltage regulator 107. The voltage regulator 107 causes an amplitude command of the current $I_L$ to increase if the voltage E is less than the command value E*, and causes the amplitude command of the current $I_L$ to decrease when the voltage E is more than the command value E*. A PI (proportional-integral) controller is used for the voltage regulator 107, for example.

Meanwhile, the control circuit detects the AC input voltage $V_{in}$ using a known voltage detector, and obtains the absolute value using the absolute value calculator 106. An output of the absolute value calculator 106 is a waveform roughly similar to that of the voltage $V_{r1}$, if the forward voltage drops of the diodes 2 to 5 are disregarded. By multiplying the output of the absolute value calculator 106 to the amplitude command of the current $I_L$ using the multiplier 108, an instantaneous value command of the current $I_L$ is obtained.

Further, the control circuit detects the current $I_L$ using a known current detector, calculates the deviation of the current $I_L$ from the aforementioned instantaneous value command using the adder 103, and inputs the obtained deviation into the current regulator 109. The current regulator 109 causes output to increase if the current $I_L$ is less than the instantaneous value command, and causes output to decrease if the $I_L$ is more than the instantaneous value command. A P (proportional) regulator is used as the current regulator 109, for example.

Next, an instantaneous value command of the voltage $V_{r2}$ is obtained by adding the absolute value of the AC input voltage $V_{in}$ and the output of the current regulator 109 using the adder 104. Here, the sign of the output of the current regulator 109 is inverted before the output is added to the absolute value of the voltage $V_{in}$. For this reason, the instantaneous value command of the voltage $V_{r2}$ decreases when the output of the current regulator 109 increases as a result of an insufficient current $I_L$, thereby enlarging the difference between the $V_{r1}$ and the $V_{r2}$. This results in a larger current flowing into the side of the switching device 7.

Further, by treating the instantaneous value command of the voltage $V_{r2}$ as a signal wave, and by comparing the signal wave with a triangular wave carrier outputted by the carrier generator 113 using the adder 105 and the comparator 111, a PWM (Pulse Width Modulation) is performed. Then the output of the comparator 111 is inputted into the logic inverter 112 to generate a gate signal for the switching device 7.

In other words, as shown in FIG. 12, when the signal wave (instantaneous value command of $V_{r2}$)>carrier, the switching device 7 is turned off and $V_{r2}$ (PWM pulse)=E, and when the signal wave<carrier, the switching device 7 is turned on and $V_{r2}$=0V. As a result, the voltage $V_{r2}$ of FIG. 10 becomes a series of pulses such as the one shown in FIG. 12. The low-frequency components of $V_{r2}$, excluding the switching frequency component, are similar to those of the voltage $V_{r1}$, and have a waveform that is slightly out of phase from the waveform of $V_{r1}$. When a difference in voltage resulting from this phase difference is applied to the inductor 6 in FIG. 10, the current $I_L$ flows, and the current $I_L$ as a result has a waveform similar to that of the voltage $V_{r1}$.

In FIG. 10, when the AC input voltage $V_{in}$ has positive polarity, the diodes 2 and 5 are electrically connected and the AC input current $I_{in}$ and the $I_L$ have identical polarity. When the voltage $V_{in}$ has negative polarity, the diodes 3 and 4 are electrically connected and the currents $I_{in}$ and $I_L$ have opposite polarities. As a result, the AC input current $I_{in}$ has a sinusoidal wave with a power factor of 1 with a phase that is substantially identical to that of the AC input voltage $V_{in}$.

Additionally, by the control operation described above, when the DC output voltage E is insufficient, the amplitude of the current $I_{in}$ is increased, and a larger amount of power flows into the circuit from the AC power source 1, thereby resulting in an increased value of the voltage E. As a result, the voltage E is kept at a desired constant value.

Note that, in FIG. 12, the carrier frequency, or the switching frequency, is indicated as approximately a few multiples of the frequency of the AC input voltage $V_{in}$ so that it is easier to view the diagram. However, in an actual device, it is common to make the carrier frequency at least 100 times the frequency of the AC input voltage $V_{in}$ (for example, if the frequency of $V_{in}$ is 50 Hz, the carrier frequency is 5 kHz or higher), so that the ripple current is kept sufficiently small even if the inductor 6 is downsized.

Meanwhile, the withstand voltages of semiconductor devices such as the diodes 2 to 5 and 8 and the switching device 7 shown in FIG. 10 need to be at least greater than the voltage E, while the voltage E must be greater than the peak value of the AC input voltage $V_{in}$. In a circuit with an AC input voltage $V_{in}$ of 200V or less (effective value; hereinafter the same), for example, semiconductor devices with a withstand voltage that is greater than the voltage E (which exceeds the peak value of the $V_{in}$) and is no more than 600V are normally used. In a circuit with an AC input voltage $V_{in}$ of 400V or less, semiconductor devices with a withstand voltage that is greater than the voltage E (which exceeds the peak value of the $V_{in}$) and is no more than 1,200V are normally used.

For this reason, when the AC input voltage $V_{in}$ exceeds 400V, semiconductors with a withstand voltage exceeding 1,200V will be required.

However, there is significant switching loss for semiconductor devices with a withstand voltage exceeding 1,200V, particularly for the switching devices 7 and the diode 8 operating at high frequency, resulting in a decreased efficiency of the device as a whole. Additionally, only a few types of semiconductor devices with such a high withstand voltage are available commercially, and it is difficult to select a semiconductor device that is appropriate in design while considering the current rating, outer geometry, price, and the like.

As a solution to this problem, there is a technology that achieves a desired withstand voltage by connecting a plurality of semiconductor devices in series. However, there is a risk of applying an overvoltage to some of the semiconductor devices unless the switching timing of the semiconductor devices are synched accurately. For this reason, applying this solution to a device that performs high-frequency switching will be difficult.

The circuit shown in FIG. 13 is a known example of a conventional technology for avoiding an increase in the withstand voltage of a semiconductor device such as the one described above.

In FIGS. 13, 20 and 21 are semiconductor switching devices; 22 and 23 are diodes, and 24 and 25 are capacitors. All other parts are given reference characters identical to those of FIG. 10.

The part constituted by the switching devices 20 and 21, the diodes 22 and 23, and the capacitors 24 and 25 is a known configuration shown in FIG. 1 of Patent Document 1, and is called a 3-level converter.

A DC output voltage E is divided by ½ into voltages $E_p$ and an $E_n$ by the capacitors 24 and 25. A voltage $V_{r2}$ becomes 0V when both of the switching devices 20 and 21 are on, and becomes $E_p$ or $E_n$, or E/2, when one of the switching devices 20 and 21 is off. When both of the switching devices 20 and 21 are off, the voltage $V_{r2}$ becomes $(E_p+E_n)$, or E.

Thus, the configuration is called "3-level converter" since there are three levels of the voltage $V_{r2}$, 0V, E/2, and E, to choose from.

According to the circuit in FIG. 13, the voltage applied respectively to the series circuit of the switching device 20 and the diode 22 and the series circuit of the switching device 21 and the diode 23 is E/2. Therefore, for identical voltages $V_{in}$ and E, the withstand voltages of semiconductor devices can be reduced by ½. In other words, if the withstand voltages of the semiconductor devices are identical, the voltages $V_{in}$ and E can be doubled. Therefore, it is possible to configure a circuit with an AC input voltage $V_{in}$ of an 800V class using semiconductor devices with a withstand voltage of 1,200V, for example.

RELATED ART DOCUMENT

Patent Document

Patent Document 1: Japanese Patent Application Laid-Open Publication H10-155282 (paragraphs [0028] and [0029], FIG. 1, and others)

SUMMARY OF THE INVENTION

However, when the AC input voltage $V_{in}$ exceeds 1,000V in the circuit shown in FIG. 13, the withstand voltages of the semiconductor devices such as the switching devices 20 and 21 and the diodes 22 and 23 are still insufficient. Technologies are available to realize multi-level circuits with an increased number of voltage levels, such as 5-level and 7-level circuits. However, the greater the voltage levels, the more complex the control operation becomes, and for this reason there are limited examples of such circuits in practical use.

Therefore, an objective of the present invention is to provide an AC-DC converter capable of inputting a high voltage using high-frequency semiconductor devices with a low withstand voltage and thereby decreasing loss, while reducing the size and cost of the device as a whole by a selection of appropriate semiconductor devices.

Another objective of the present invention is to provide an AC-DC converter that achieves functions comparable to those of a multi-level circuit using a simple configuration while downsizing the inductor provided in the DC circuit.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an AC to DC converter, including: a rectifier circuit that rectifies an AC voltage generated by an AC voltage source; and a plurality of switching units that collectively receive an output voltage of the rectifier circuit through an inductor, and that are connected in series at an input side, each of the switching units having a semiconductor switching device, a diode, and a capacitor, and performing ON/OFF switching of the semiconductor switching device provided therein to step up a voltage received from the rectifier circuit, each of said switching units supplying the stepped-up voltage to the capacitor through the diode so that a resulting DC across the capacitor can be provided, as a DC output voltage of the switching unit, to a respective load to be connected to terminals of the capacitor.

According to the present invention, it is possible to connect a plurality of switching units in series by using existing semiconductor devices with a low withstand voltage, provided that the load of the AC-DC converter is divided into a plurality of loads that are independent from one another in terms of electric potential.

Additionally, the AC to DC converter may further include a plurality of isolated DC-DC converters respectively connected to the plurality of switching units, input terminals of each isolated DC-DC converter being connected in parallel to the capacitor of the corresponding switching unit, and being isolated from output terminals of the isolated DC-DC converter.

Such a configuration is particularly valuable when an isolated DC-DC converter circuit is connected downstream of the switching unit that constitutes the AC-DC converter circuit, and the circuits together constitute an isolated AC-DC converter. In other words, by taking advantage of the fact that the input side and the output side of the DC-DC converter circuit are independent of each other in terms of electrical potential, the DC-DC converter circuit can be divided into a plurality of units. Then the individual DC-DC converter circuit can be respectively connected to output sides of the plurality of switching units connected in series. In this case, the output sides of the DC-DC converter circuits are isolated. In addition, the input sides of individual DC-DC converter circuits are isolated from other DC-DC converter circuits. Therefore, it is possible to set the electrical potential on the input side of each DC-DC converter circuit to any value.

Note that the output terminals of the isolated DC-DC converters can be connected in parallel or in series.

Further, in the present invention, it is desirable to provide a control device that performs pulse width modulation control on the semiconductor switching device to control the DC output voltage in each of the switching units, and that controls a waveform of an AC current flowing into the rectifier circuit from the AC voltage source so as to be a sinusoidal waveform.

In addition, it is preferable that the control device cause time differences in switching timing among the plurality of switching units. Specific methods of the control operation include, for example, causing carriers, which are used to perform a PWM on each switching unit, to have a phase difference.

Further, a configuration such as the one described below is effective for preventing an imbalance among DC output voltages of the plurality of switching units and equalizing the same:

a pulse width correction unit that performs pulse width modulation control on the respective switching units such that, when the DC output voltage of one switching unit is lower than the DC output voltage of another switching unit, a conducting period of the diode in the one switching unit is caused to be longer than in the another switching unit, and such that when the direct current output voltage of the one switching unit is higher than the direct current output voltage of the another switching unit, the conducting period of the diode in the one switching unit is caused to be shorter than in the another switching unit.

In addition, for each of the plurality of switching units, the control device can compare a signal wave with a carrier to perform pulse width modulation control so as to generate a driving signal for the semiconductor switching devices in the switching units, and the pulse width correction unit can generate the signal wave separately for each of the plurality of switching units by multiplying a common signal wave with a value that is proportional to a reciprocal of the DC output voltage of the corresponding switching unit, or by adding the common signal wave to a value that is proportional to a value obtained by subtracting the DC output voltage of the corresponding switching unit from an average value of the DC output voltages of all of the switching units.

Furthermore, a need for voltage detectors that individually detect DC output voltages of switching units may be eliminated in the following manner:

A voltage detector that detects a terminal voltage across the plurality of switching units connected in series in the input side; and an output voltage identifying circuit that, based on a change in the voltage detected by the voltage detector and a state of switching of the plurality of switching units, identifies which of the switching units has caused the change in the voltage across the plurality of switching units.

The DC output voltage of each switching unit can also be detected by providing: an inductor voltage detector that detects a terminal voltage across the inductor; and an output voltage identifying circuit that, based on a change in the voltage detected by the inductor voltage detector and a state of switching of the plurality of switching units, identifies which of the switching units has caused the change in the voltage across the inductor.

The inductor voltage detector may also be configured with a high-frequency transformer or the like. A primary coil of the transformer may be connected to the inductor in parallel and a secondary coil of the transformer may be connected to the output voltage identifying circuit.

Another configuration example of the inductor voltage detector is a detector that detects a derivative of a current flowing through the inductor inside.

According to at least some aspects of the present invention, it is possible to configure an AC-DC converter capable of accommodating a high AC voltage input without using semiconductor devices with a high withstand voltage. In other words, by using semiconductor devices having a low withstand voltage and producing a low level of loss, it is possible to achieve higher efficiency in the device as a whole, and to reduce the size and cost thereof by selecting appropriate devices.

Additionally, when staggering the switching timing of the plurality of switching units connected in series, when the number of switching units connected in series is n (where n is greater than 1), the switching frequency of the device as a whole is n times greater than when there is a single switching unit (as is the case in a conventional technology shown in FIG. 10, for example). This makes it possible to achieve the functions of a multi-level circuit, which decreases the variation of a voltage due to switching to 1/n, as shown in FIG. 13. In addition, since a component with a small inductance can be used as an inductor for the DC circuit, the AC-DC converter can be made even smaller.

It is to be understood that both the foregoing general description and the following detailed description are exemplary and explanatory, and are intended to provide further explanation of the invention as claimed.

DETAILED DESCRIPTION OF EMBODIMENTS

Embodiments of the present invention will be described below with reference to diagrams.

Figure 1:
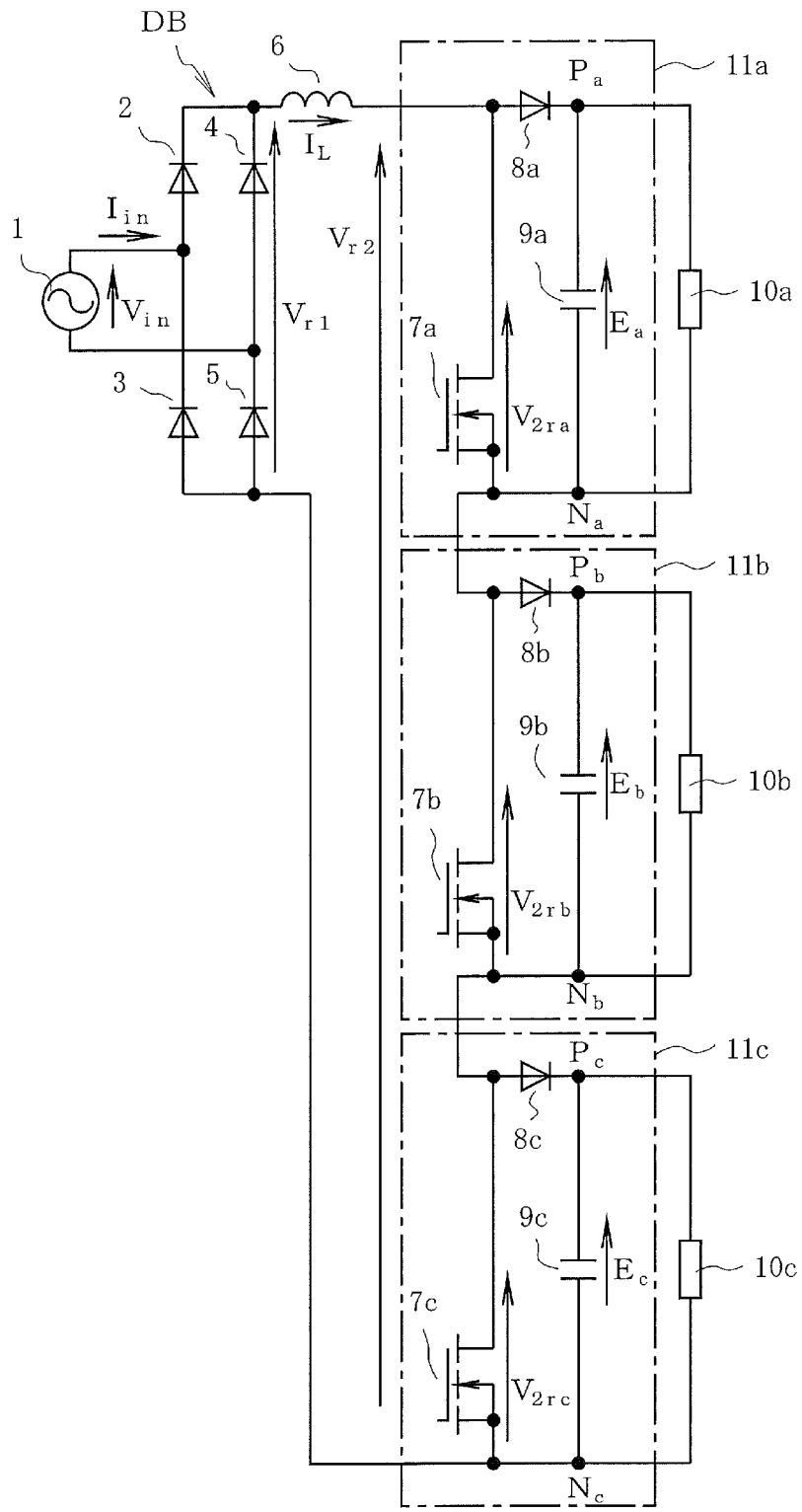
FIG. 1 is a circuit diagram showing Embodiment 1 of the present invention.
Figure 10:
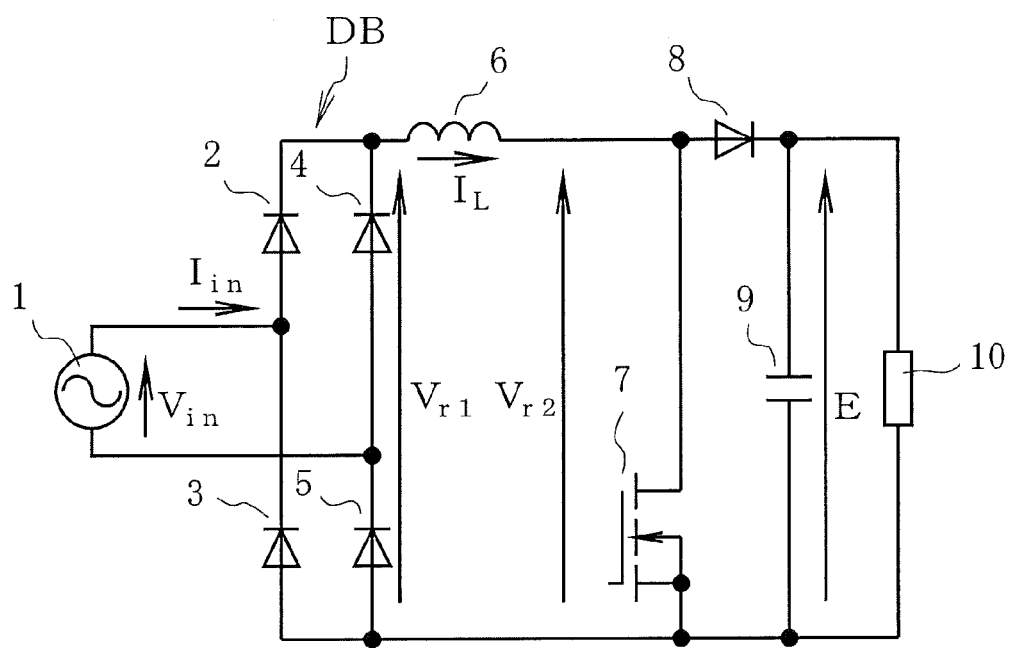
FIG. 10 is a circuit diagram showing a conventional AC-DC converter.
Figure 13:
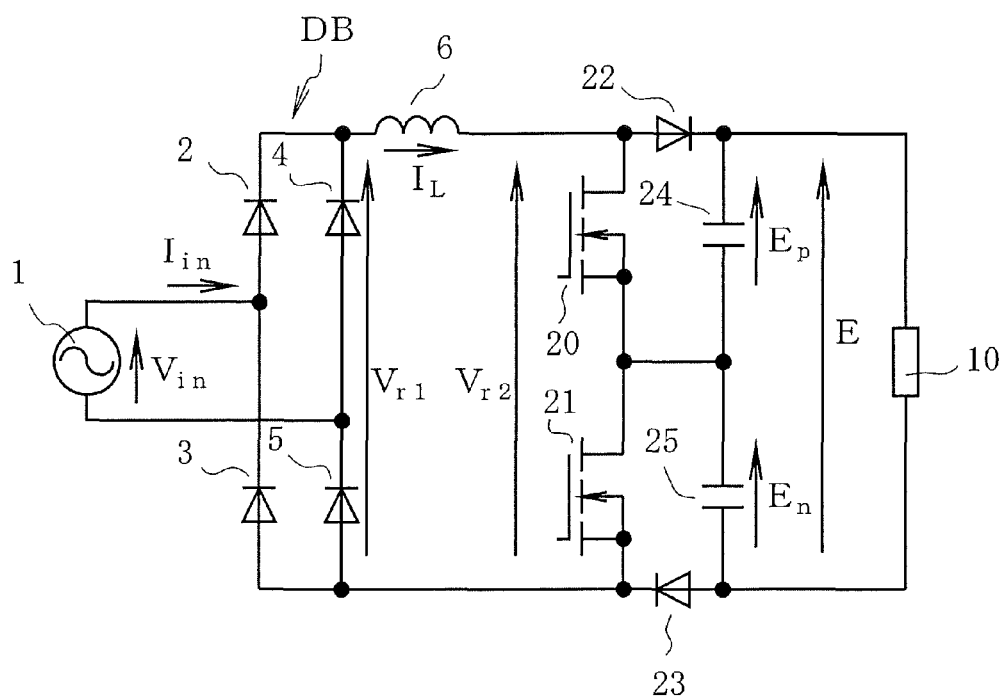
FIG. 13 is a circuit diagram corresponding to a conventional technology described in Patent Document 1.

FIG. 1 is a circuit diagram showing Embodiment 1 of the present invention 1. In FIG. 1, those portions having functions identical to those of FIGS. 10 and 13 are given identical reference characters.

In FIG. 1, a rectifier circuit DB constituted by diodes 2 to 4 5 are connected to both ends of an AC power source 1 in a manner similar to the description above. One end of an inductor 6 is connected to a positive-side output terminal of the rectifier circuit DB. Between the other end of the inductor 6 and a negative-side output terminal of the rectifier circuit DB, semiconductor switching devices 7a, 7b, and 7c are connected in series. Other than the MOSFETs shown in the diagram, IGBTs or BJTs may also be used as the switching devices 7a, 7b, and 7c.

Between the drain and source terminals of the switching device 7a, a diode 8a and a capacitor 9a are connected in series, and a load 10a is connected to the capacitor 9a in parallel. Additionally, between the drain and source terminals of the switching device 7b, a diode 8b and a capacitor 9b are connected in series, and a load 10b is connected to the capacitor 9b in parallel. Similarly, between the drain and source terminals of the switching device 7c, a diode 8c and a capacitor 9c are connected in series, and a load 10c is connected to the capacitor 9c in parallel.

Here, the switching device 7a, the diode 8a, and the capacitor 9a constitute a first switching unit 11a. The switching device 7b, the diode 8b, and the capacitor 9b constitute a second switching unit 11b. The switching device 7c, the diode 8c, and the capacitor 9c constitute a third switching unit 11c.

While three switching units, 11a, 11b, and 11c, are connected in series in Embodiment 1, any number of switching units may be connected in series, provided that there is more than one.

In FIG. 1, $E_a$ is a terminal voltage across the capacitor 9a (output voltage of the switching unit 11a), $E_b$ is a terminal voltage across the capacitor 9b (output voltage of the switching unit 11b), and $E_c$ is a terminal voltage across the capacitor 9c (output voltage of the switching unit 11c). In addition, $P_a$, $P_b$, and $P_c$ respectively represent the positive poles of the capacitors 9a, 9b, and 9c while $N_a$, $N_b$, and $N_c$ respectively represent the negative poles of the capacitors 9a, 9b, and 9c. Here, the capacitances of the capacitors 9a, 9b, and 9c are identical.

Additionally, in the following description, the forward voltage drops of the switching devices 7a, 7b, and 7c and the diodes 8a, 8b, and 8c will be disregarded.

According to Embodiment 1, a voltage $V_{r2}$ is the sum of the voltages $E_a$, $E_b$, and $E_c$. For this reason, each of the voltages $E_a$, $E_b$, and $E_c$ only needs be a value that is ⅓ of the $V_{r2}$. In other words, for each of the switching devices 7a, 7b, and 7c and the diodes 8a, 8b, and 8c, a device having a withstand voltage corresponding to a value that is ⅓ of the $V_{r2}$ can be used.

Note that, for example, the potential of the negative pole $N_b$ of the switching unit 11b is equal to the potential of the negative pole $N_c$ when the switching device 7c of the switching unit 11c is on, and is equal to the potential of the positive pole $P_c$ when the switching device 7c is off. In other words, the potential of one end of the load 10b fluctuates due to the switching of another switching unit, 11c. For this reason, it is desirable that the loads 10a, 10b, and 10c be independent of one another in terms of electric potential.

Figure 2:
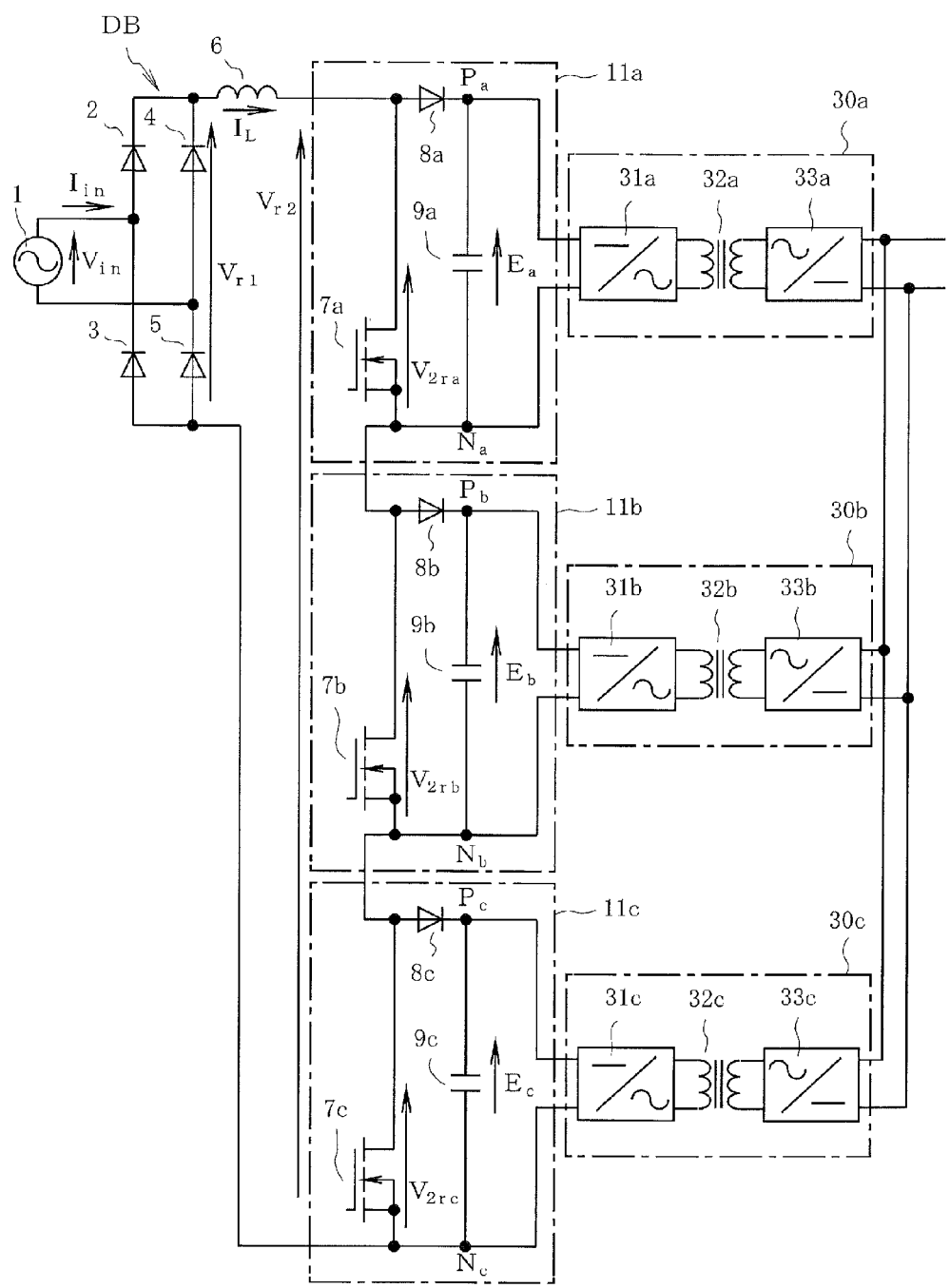
FIG. 2 is a circuit diagram showing Embodiment 2 of the present invention.

FIG. 2 shows Embodiment 2 of the present invention in which instead of the loads, DC-DC converter circuits are attached.

In FIGS. 2, 30a, 30b, and 30c are DC-DC converter circuits, and respectively replace the loads 10a, 10b, and 10c of FIG. 1. All other configurations are identical to those of FIG. 1.

In the DC-DC converter circuits 30a, 30b, and 30c: 31a, 31b, and 31c are DC-AC converting parts, 32a, 32b, and 32c are transformers, and 33a, 33b, and 33c are AC-DC converting parts (rectifiers). While not shown in the diagram, DC loads are respectively connected to the output sides of the AC-DC converting parts 33a, 33b, and 33c.

In general, the output frequencies of the DC-AC converting parts 31a, 31b, and 31c are set to a few kHz to a few dozen kHz or more in order to keep the transformers 32a, 32b, and 32c compact.

In Embodiment 2, the output sides of the AC-DC converting parts 33a, 33b, and 33c are connected together in parallel. On the other hand, the input sides of the DC-AC converting parts 31a, 31b, and 31c are respectively isolated by the transformers 32a, 32b, and 32c so as to be independent from the output sides of the AC-DC converting parts 33a, 33b, and 33c. For this reason, the input sides of the DC-AC converting parts 31a, 31b, and 31c can be respectively connected to a location of any electrical potential. In other words, in Embodiment 2, the condition of "the loads 10a, 10b, and 10c being independent from one another in terms of electric potential" in FIG. 1 can be fulfilled.

While the output sides of the AC-DC converting parts 33a, 33b, and 33c are connected in parallel in FIG. 2, these output sides may also be connected in series. In addition, four units (four groups) of a circuit group constituted by a switching unit and a DC-DC converter circuit may be provided, for example. The output sides of two of such groups may be connected in series, and the output sides of the remaining two groups may be connected in parallel. Then the series connections and the parallel connections may be combined such that that a symmetry is maintained between each group.

Further, if the output powers of the AC-DC converting parts 33a, 33b, and 33c are equal to one another, it is possible to supply the powers to respective DC loads by leaving the output sides separate without connecting to one another.

Figure 3:
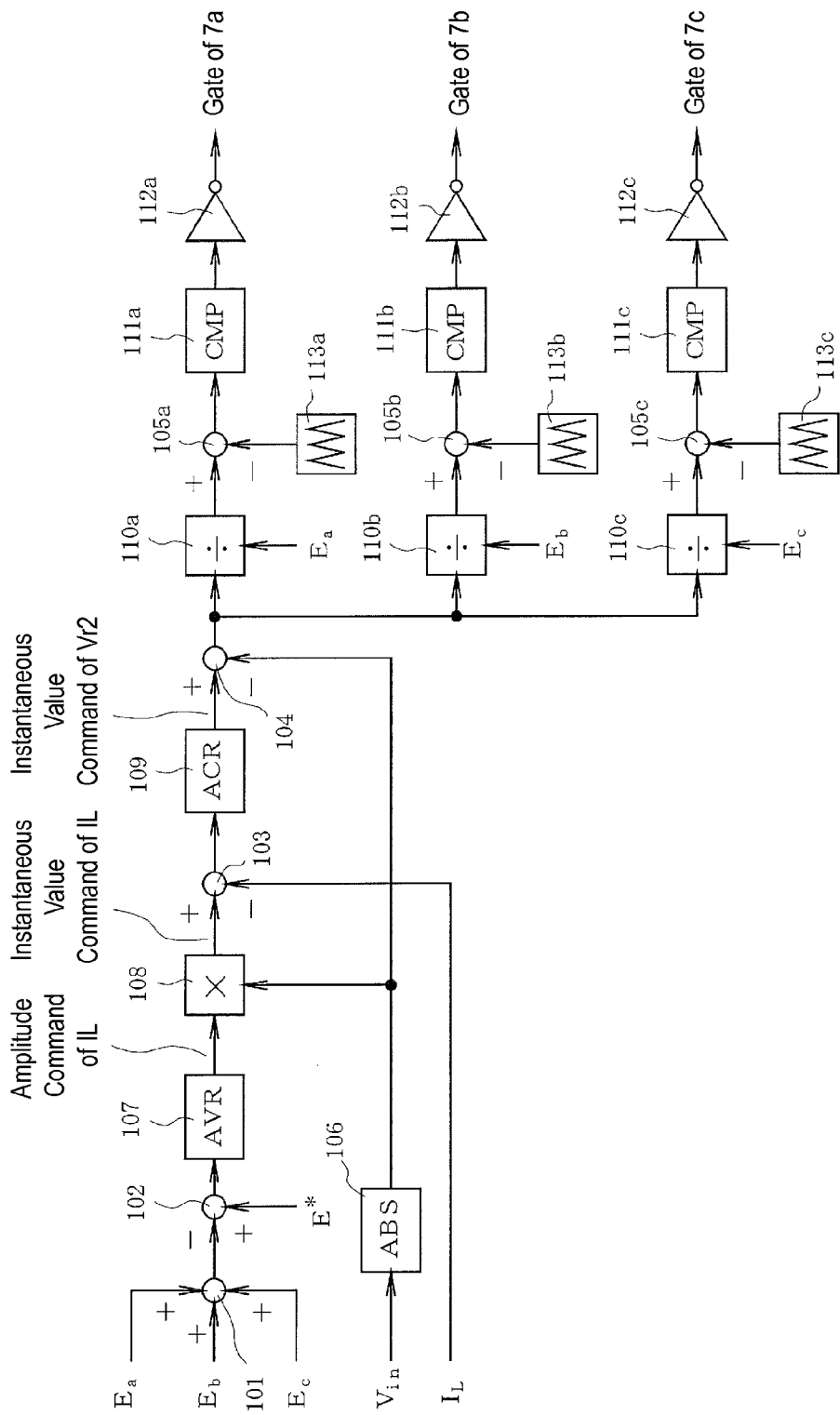
FIG. 3 is a block diagram of a control circuit according to Embodiment 3 of the present invention.
Figure 4:
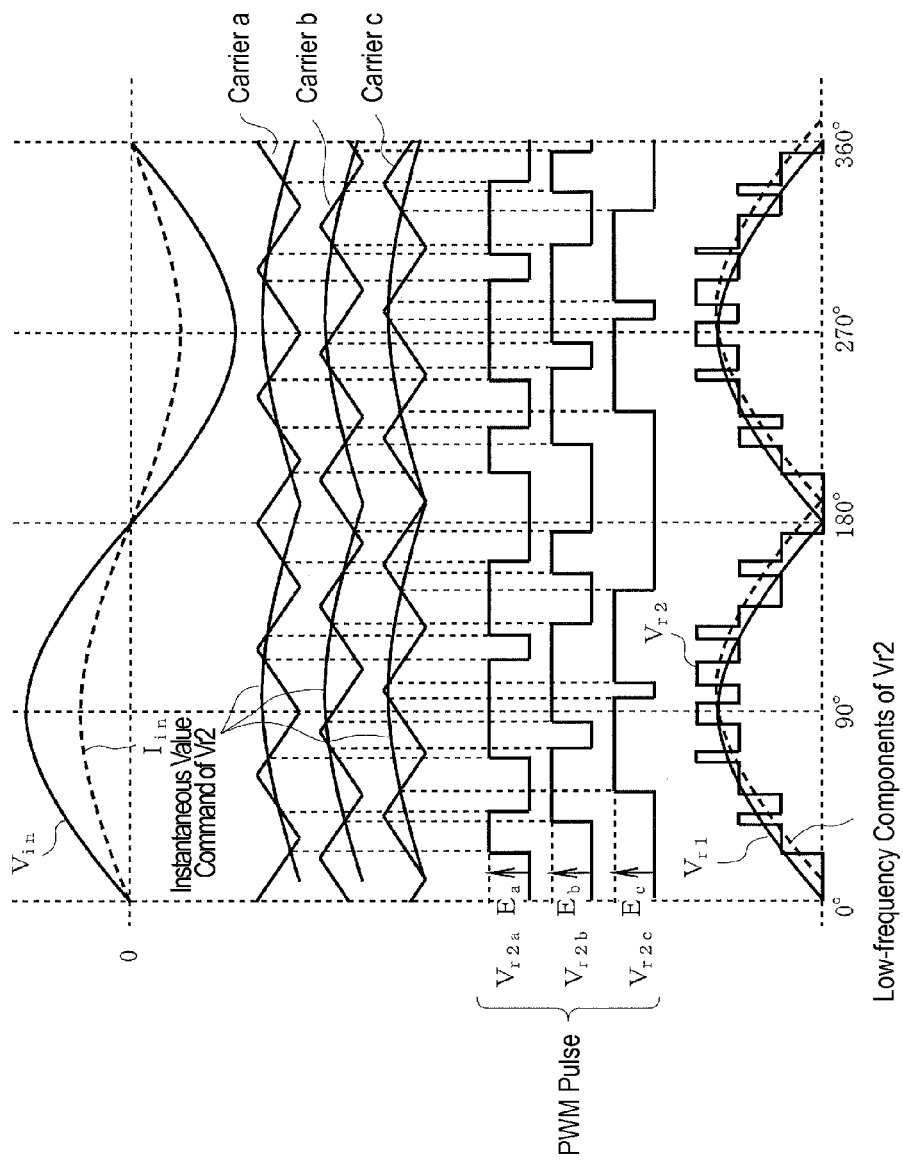
FIG. 4 is a waveform diagram showing an operation of FIG. 3.

Next, FIG. 3 shows an internal configuration of a control device according to Embodiment 3 of the present invention, and FIG. 4 shows an operation of FIG. 3. Embodiment 3 is for controlling the switching devices 7a, 7b, and 7c in FIG. 1 or 2 4 7.

Figure 11:
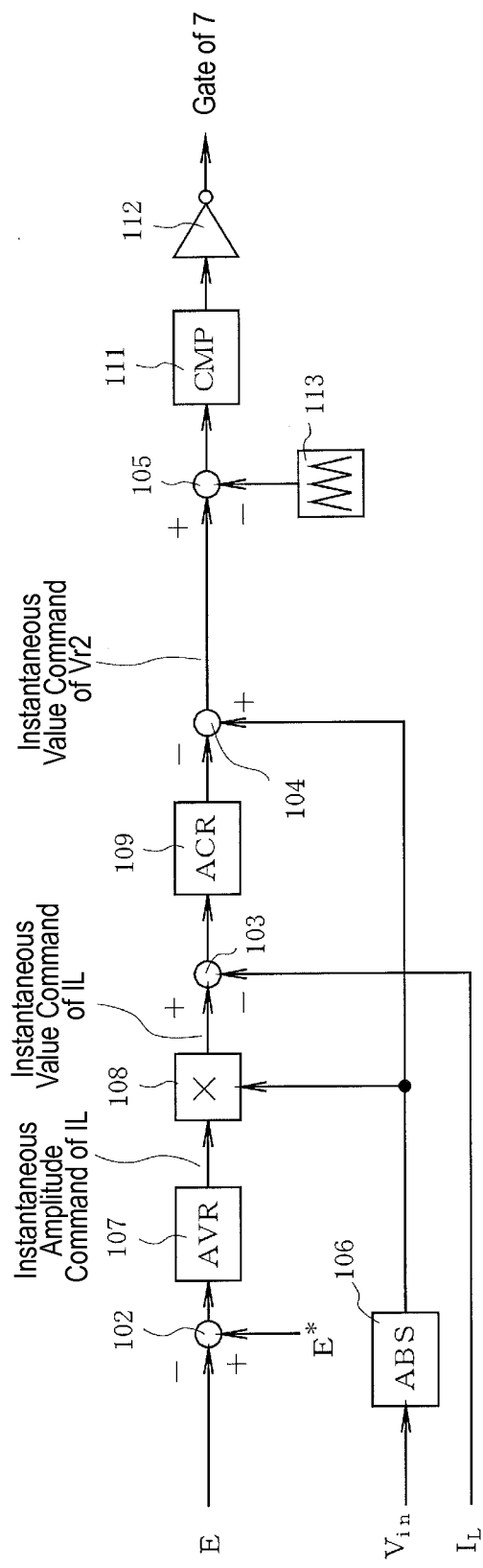
FIG. 11 is a block diagram of a control circuit for controlling a switching device in FIG. 10.

In FIG. 3, adders 105a, 105b, and 105c, comparators 111a, 111b, and 111c, logic inverters 112a, 112b, 112c, and carrier generators 113a, 113b, and 113c are provided in three groups to respectively correspond to the switching units 11a, 11b, and 11c of FIGS. 1 and 2, and are respectively equivalent to the adder 105, the comparator 111, the logic inverter 112, and the carrier generator 113 of FIG. 11. Functions of dividers 110a, 110b, and 110c, respectively provided upstream of the adders 105a, 105b, and 105c, will be described later.

In FIG. 3, while the basic principles of controlling a current $I_L$ are the same as those in FIG. 11, an adder 101 is further provided upstream of the adder 102 in FIG. 3. The adder 101 is provided to obtain a sum of output voltages $E_a$, $E_b$, and $E_c$ of the groups, and control operation is performed so that the sum of the $E_a$, $E_b$, and $E_c$ matches a command value E*.

In addition, in Embodiment 3, while the frequencies of carriers a, b, and c generated by carrier generators 113a, 113b, and 113c are identical to one another, the phases of the carriers a, b, and c are different from one another as shown in FIG. 4. Here, since there are three groups of the switching units, 11a, 11b, and 11c, the phase difference among the carriers a, b, and c is 360°/3=120° in electrical angle.

Note that in FIG. 4, an instantaneous value command of a $V_{r2}$ is illustrated for each of the carriers a, b, and c. However, this is only done to facilitate understanding; in reality, there is only a single instantaneous value command for the $V_{r2}$. In addition, $V_{era}$, $V_{2rb}$, and $V_{2rc}$ in FIG. 4 respectively represent input voltages of the switching units 11a, 11b, and 11c of FIGS. 1 and 2, and correspond to PWM pulses of the switching devices 7a, 7b, and 7c.

As described above, the phases of the carriers a, b, and c are different from one another. As a result, the frequency manifested in the voltage $V_{r2}$ by a switching operation of the device as a whole becomes three times the carrier frequency, and a voltage with this frequency is applied to an inductor 6 of the DC circuit. In addition, when a comparison is made to FIG. 12 based on an assumption that a DC output voltage E (=$E_a$+$E_b$+$E_c$) is equal to the E in FIG. 12, the variation of the $V_{r2}$ resulting from a switching operation is ⅓ of the variation in FIG. 12. Therefore, it is possible to sufficiently suppress the ripple included in a current $I_L$ even if the capacity and the size of the inductor 6 are reduced.

Figure 12:
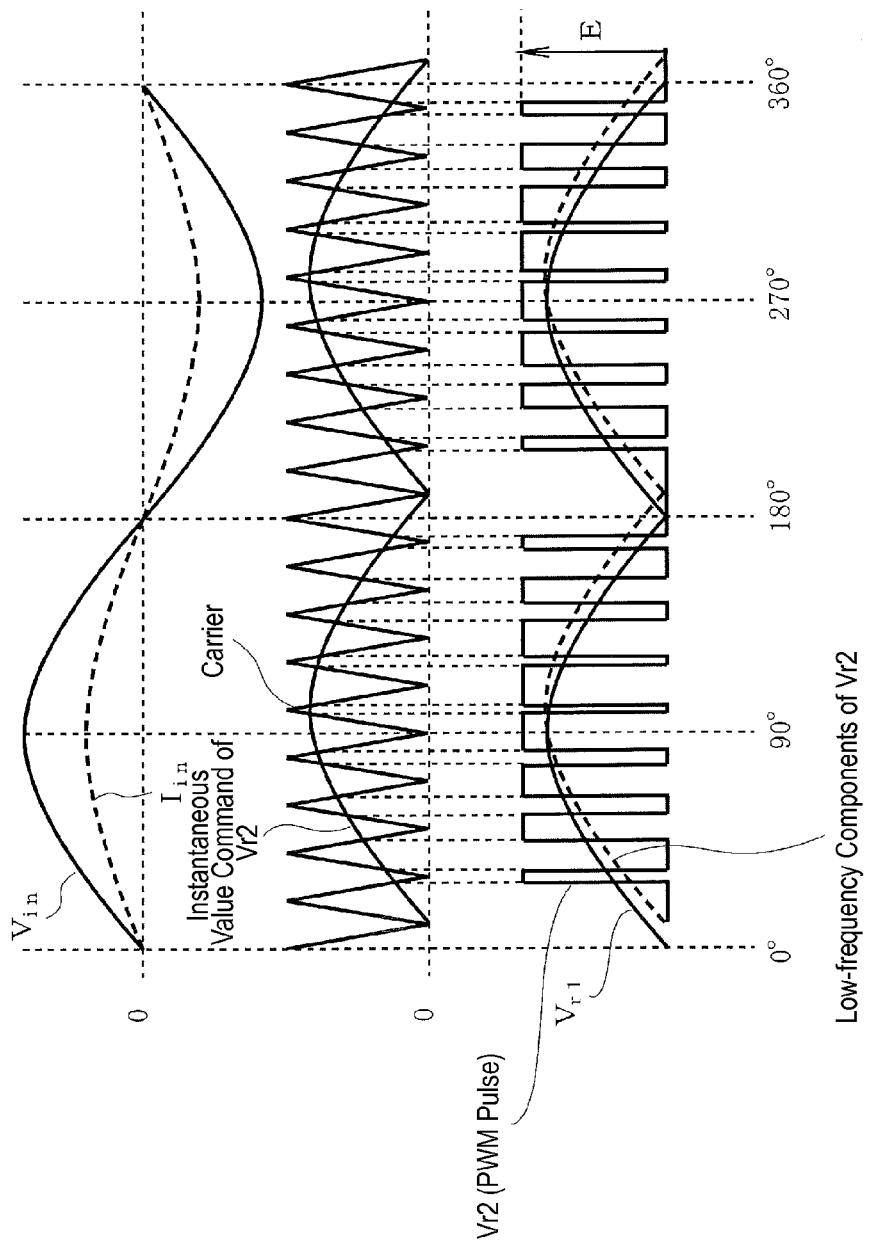
FIG. 12 is a waveform diagram for describing operations of FIGS. 10 and 11.

At the same time, if each of the voltages applied to the switching devices 7a, 7b, and 7c is ⅓ of the E in FIG. 12, the switching loss is also reduced to ⅓, provided that the switching frequency is identical to that of FIG. 12.

As a result of these effects, it is possible to achieve an AC-DC converter that is higher in efficiency, smaller in size, and lower in cost as a whole.

Further, since these aspects of the present invention eliminate the need for a high-frequency switching device with a high withstand voltage, the effect of using the circuit shown in FIG. 1 or 2 is particularly evident in a circuit where an AC input voltage $V_{in}$ is 1,000V or above.

In other words, according to these aspects of the present invention, it is possible to achieve functions comparable to those of the multi-level circuit shown in FIG. 13 by connecting a plurality of groups of switching units in series and by using a control circuit (FIG. 3) that causes the phases of the carriers to be different from one another based on the same principles as those of a conventional control circuit (FIG. 11).

Note that the above description assumes that the voltages $E_a$, $E_b$, and $E_c$ respectively applied to the switching devices 7a, 7b, and 7c are identical. However, even if the values of loads 10a, 10b, and 10c of the switching units 11a, 11b, and 11c are all equal, and the on-off pulse widths of the switching devices 7a, 7b, and 7c are kept identical, a slight variation in properties of the components and the like may cause an imbalance among the voltages $E_a$, $E_b$, and $E_c$. When the imbalance among the voltages increases, an overvoltage is applied to one of the switching units 11a, 11b, and 11c and causes the device to malfunction. For this reason, it is preferable to keep the voltages $E_a$, $E_b$, and $E_c$ equal.

Therefore, the dividers 110a, 110b, and 110c are respectively provided on the signal wave input side of the adders 105a, 105b, and 105c in the control circuit shown in FIG. 3. The dividers 110a, 110b, and 110c constitute the pulse width correction part.

The dividers 110a, 110b, and 110c respectively divide the instantaneous value command of the voltage $V_{r2}$ by the normalized values of $E_a$, $E_b$, and $E_c$ (values that yield 1.0 when $E_a$, $E_b$, and $E_c$=E/3). The voltages $E_a$, $E_b$, and $E_c$ can be kept equal by using the outputs of the dividers 110a, 110b, and 110c as signal waves to control the switching devices 7a, 7b, and 7c individually.

In other words, by multiplying values that are proportional to the inverses of the DC output voltages $E_a$, $E_b$, and $E_c$ respectively to the output of the adder 104, it is possible to generate separate signal waves for the switching units 11a, 11b, and 11c.

To illustrate, a case in which the voltage $E_a$ is approximately 10% lower than a set value and a case in which the voltage $E_a$ is equal to the set value will be described. Assuming that the instantaneous value command of the voltage $V_{r2}$ is the same for both cases, the signal wave used for a PWM control of a switching device 7a will be approximately 10% greater when the voltage $E_a$ is approximately 10% lower than the set value than when the voltage $E_a$ is equal to the set value.

This means that, in FIG. 1, for example, the duration in which the switching device 7a is turned off, or the duration in which the diode 8a stays on, becomes longer, and that the recharging time of the capacitor 9a becomes longer. A current $I_L$ is naturally common to the switching units 11a, 11b, and 11c, which are connected in series. For this reason, when the recharging time of the capacitor 9a is prolonged, energy received by the capacitor 9a increases in proportion. The voltage $E_a$ then rises toward the voltages, $E_b$ and $E_c$. As a result, the imbalance among the voltages $E_a$, $E_b$, and $E_c$ is eliminated.

In addition, when the DC voltage $E_a$ or the like is low for an equal value of an instantaneous command value of the $V_{r2}$, the pulse amplitude of the $V_{r2a}$ or the like becomes small. However, because the dividers 110a, 110b, 110c are provided, the pulse width of the voltage becomes longer. Consequently, the voltage-time products are equal regardless of changes in the DC voltages, and average values within the switching periods are kept constant. This achieves an added effect of improved control of waveforms.

Note that the dividers 110a, 110b, 110c may be configured by combining inverse function generators and multipliers. In some cases, however, it is desirable that the number of dividers and multipliers be minimized in order to simplify the control circuit. Therefore, to realize the functions of the dividers 110a, 110b, 110c, k(E/3−E$_a$), k(E/3−E$_b$), and k(E/3−E$_c$) may be respectively added to the instantaneous value command of the voltage V$_{r2}$ in each group. Here, k is a factor of proportionality. The rationale behind this is that, for a deviation Δx that is sufficiently smaller than 1, the following approximate equation is established based on an assumption that the values are normalized to yield 1 under a rated condition:

$$1/(1-\Delta x) \approx 1+\Delta x$$

For this reason, applying an approximate method of adding k(E/3−E$_a$), k(E/3−E$_b$), and k(E/3−E$_c$) respectively to the instantaneous value command of V$_{r2}$, instead of dividing and multiplying, does not pose any problems in terms of control errors.

In other words, it is possible to approximate the signal waves for the switching units 11a, 11b, and 11c individually by respectively adding k(E/3−E$_a$), k(E/3−E$_b$), and k(E/3−E$_c$) to the output of the adder 104. k(E/3−E$_a$), k(E/3−E$_b$), and k(E/3−E$_c$) are values proportional to the values obtained by subtracting the DC output voltages E$_a$, E$_b$, and E$_c$ respectively from an average value (E/3) of the DC output voltages of the switching units 11a, 11b, and 11c.

Figure 5:
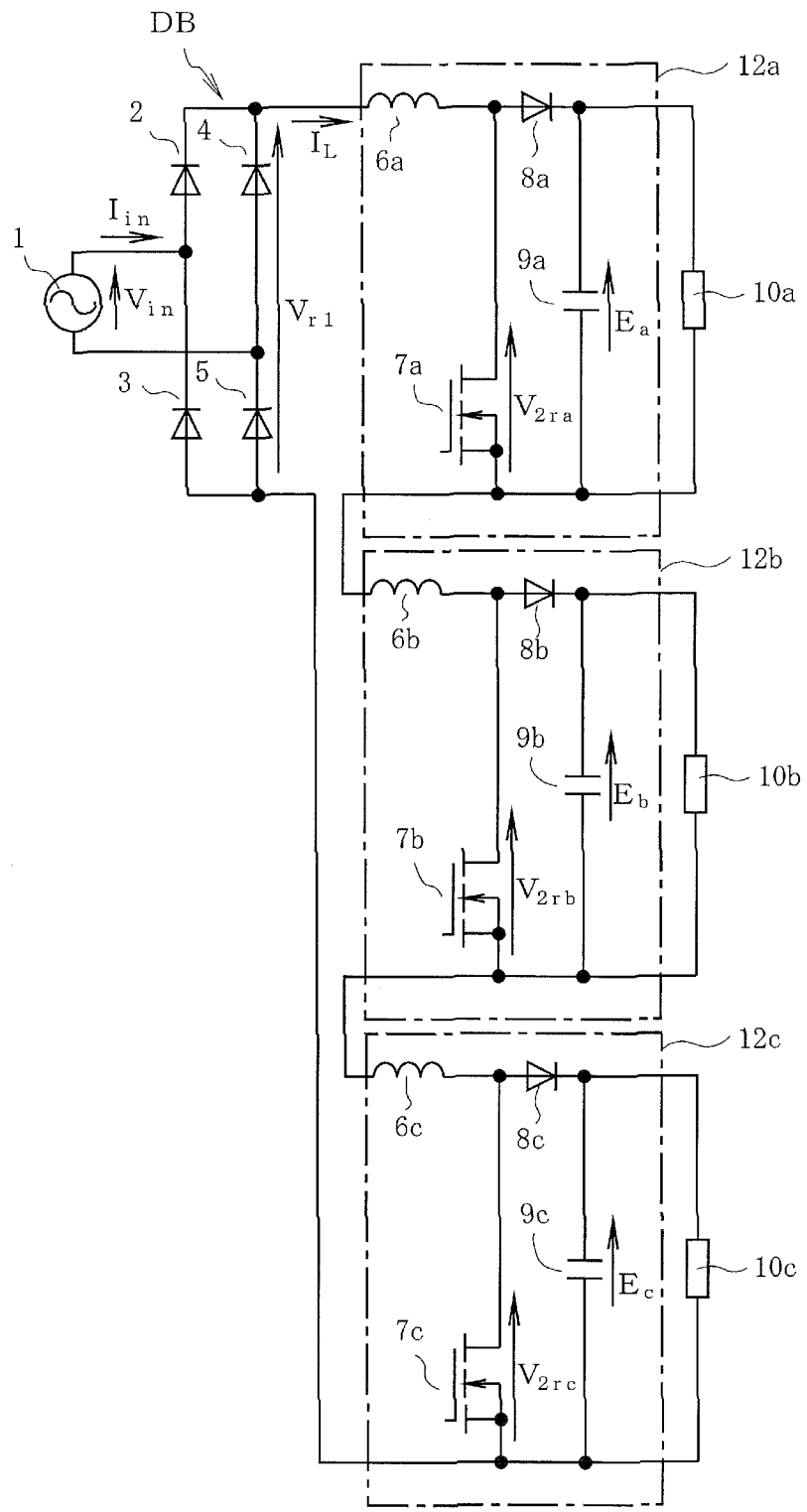
FIG. 5 is a circuit diagram showing Embodiment 4 of the present invention.

Next, FIG. 5 shows Embodiment 4 of the present invention. In Embodiment 4, a single inductor 6 in FIG. 1 is divided into three inductors, 6a, 6b, and 6c, and the inductors 6a, 6b, and 6c are respectively disposed in switching units 12a, 12b, and 12c. Other configurations are identical to those of FIG. 1.

Based on the same operational principles as those of FIG. 1, Embodiment 4 allows the inductance of each of the inductors 6a, 6b, and 6c to be smaller than the inductance of the inductor 6 of FIG. 1.

Figure 6:
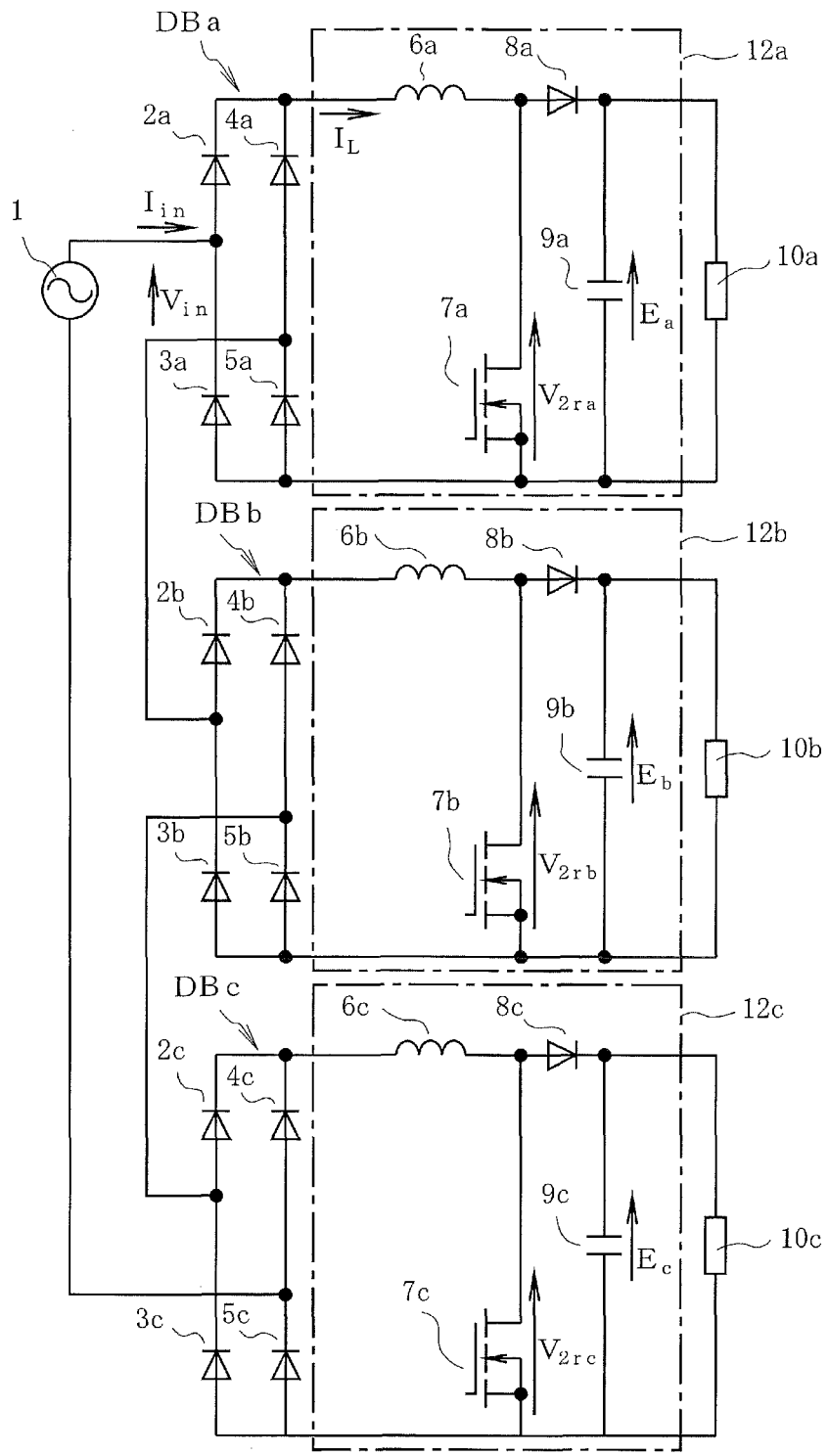
FIG. 6 is a circuit diagram showing Embodiment 5 of the present invention.

FIG. 6 shows Embodiment 5 of the present invention. In Embodiment 5, rectifier circuits DBa, DBb, and DBc are provided in lieu of the rectifier circuit DB in FIG. 1 on the input sides of the switching units 12a, 12b, and 12c, respectively. 2a to 5a are diodes constituting the rectifier circuit DBa; 2b to 5b are diodes constituting the rectifier circuit DBb; and 2c to 5c are diodes constituting the rectifier circuit DBc.

One end of an AC power source 1 is connected to one of the input terminals of the rectifier circuit DBa and the other end is connected to one of the input terminals of the rectifier circuit DBc. The other input terminals of the rectifier circuits DBa and DBc are respectively connected to the two input terminals of the rectifier circuit DBc. As a result of this connection, the rectifier circuits DBa, DBb, and DBc are connected in series. At the same time, the switching units 12a, 12b, and 12c are connected to one another via the connections between the respective diodes on the input side and via the AC power source 1.

Operational principles of Embodiment 5 are also identical to those of FIG. 1. Semiconductor devices that are lower in withstand voltage can be employed for the diodes used in the rectifier circuits DBa, DBb, and DBc than those employed for the diodes used in the rectifier circuit DB in FIG. 1. Note that, in comparison to the switching devices 7a, 7b, and 7c, which operate at high frequency, it is relatively easy to connect diodes, which operate at low frequency, in series. Therefore, a circuit configuration such as the one shown in FIG. 6 does not pose any problems.

Additionally, as a method of obtaining the same effect, the diode 2 of the rectifier circuit DB in FIG. 1 may be configured with the series circuits of 2a, 2b, and 2c used in FIG. 6, for example. The same applies to the diodes 3 to 5.

Meanwhile, in Embodiments 1 to 5 described above, in order to achieve a balance among the voltages E$_a$, E$_b$, and E$_c$ of the switching units 11a, 11b, and 11c, or 12a, 12b, and 12c, it is necessary to detect the voltages E$_a$, E$_b$, and E$_c$ individually. Embodiments 6 to 8 described below will show the specifics of how the voltages E$_a$, E$_b$, and E$_c$ are detected.

Figure 7:
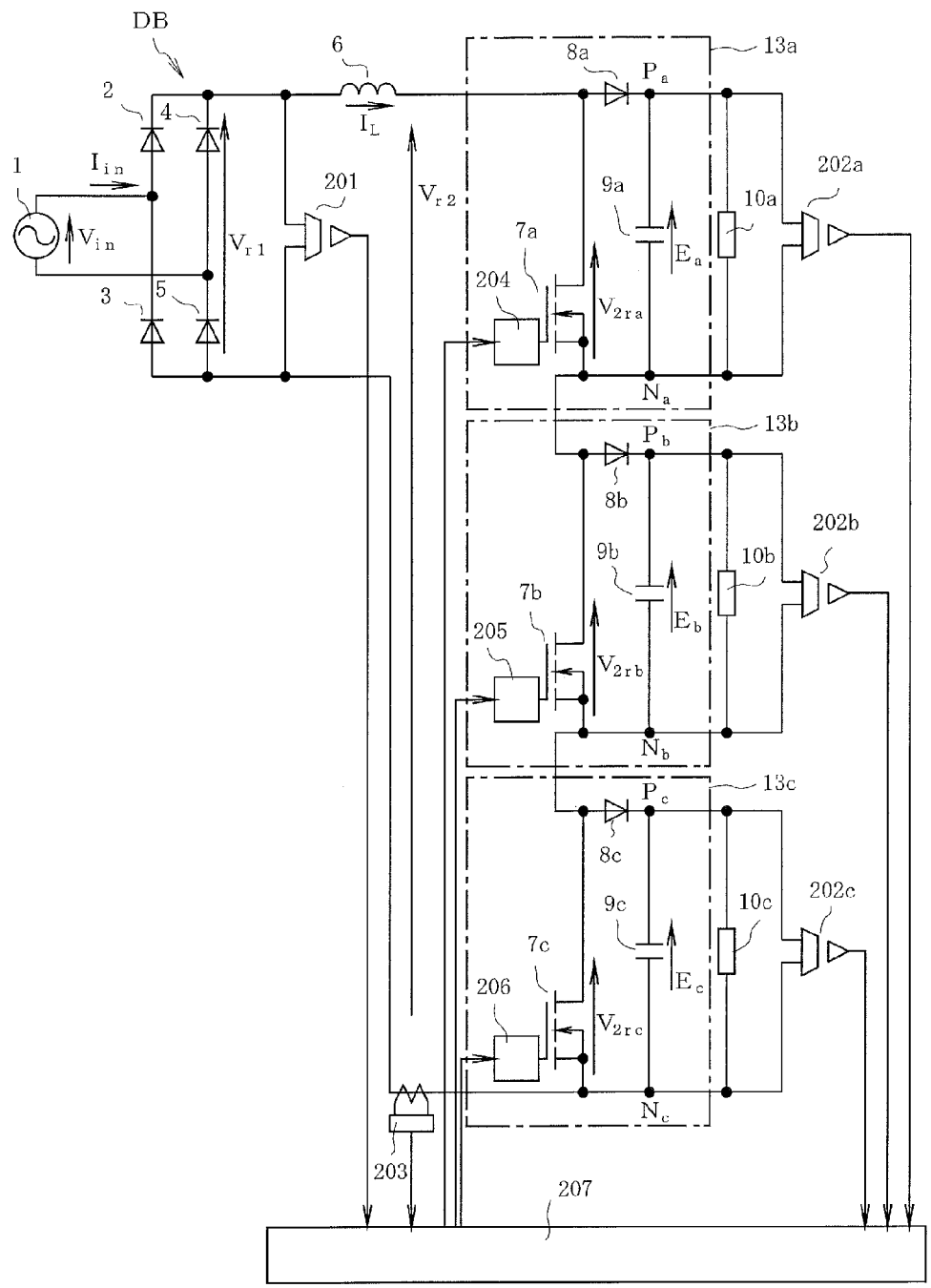
FIG. 7 is a circuit diagram showing Embodiment 6 of the present invention.

First, FIG. 7 is a circuit diagram showing Embodiment 6 of the present embodiment. Those parts having identical functions as those of Embodiments 1 to 5 are given identical reference characters.

In FIG. 7, an isolated amplifier 201 is connected as a voltage detector between output terminals of a rectifier circuit DB. The isolated amplifier 201 detects a voltage V$_{r1}$, isolates the detected value, and transmits the same to a control device 207.

Meanwhile, switching units 13a, 13b, and 13c are respectively equipped with isolated digital signal transmitters 204, 205, and 206. The isolated digital signal transmitters 204, 205, and 206 receive digital signals of on-off commands from the control device 207, isolate the on-off commands, and provide the same to switching devices 7a, 7b, and 7c.

Isolated amplifiers 202a, 202b, and 202c are respectively connected as voltage detectors on the output sides of the switching units 13a, 13b, and 13c. These isolated amplifiers 202a, 202b, and 202c isolate detected values of output voltages E$_a$, E$_b$, and E$_c$, and transmit the same to the control device 207.

A current detector 203 constituted by a Hall CT (Current Transfer) or the like is connected to a DC mother line between the switching unit 13c and a negative-side output terminal of the rectifier circuit DB. The current detector 203 detects a current I$_L$ in an isolated state, and transmits the detected value to the control device 207.

Note that, theoretically speaking, it is possible to keep the control device 207 unisolated from the main circuit, which includes the AC power source 1, the rectifier circuit DB, the switching units 13a, 13b, and 13c, and the like, and use differential amplifiers in lieu of the isolated amplifiers 201, 202a, 202b, and 202c.

However, the present invention targets a circuit with a high-voltage AC power source 1. For this reason, if the control device 207 is not isolated from the main circuit, safety becomes a major concern. At the same time, differential amplifiers raise problems such as a larger partial resistance and an increase in loss. Therefore, from Embodiment 6 and onward, the main circuit side will be isolated from the control device 207, and isolated amplifiers will be used to detect voltages.

At the same time, gate driving signals of the switching devices 7a, 7b, and 7c also need to be respectively isolated from the control device 207. This is why the isolated digital signal transmitters 204, 205, and 206 are provided.

Note that, in Embodiment 6, the number of isolated amplifiers 202a, 202b, and 202c need to correspond to the number of switching units 13a, 13b, and 13c connected in series. The more switching units there are, the more isolated amplifiers are required. However, isolated amplifiers are costly in general, and those with a higher dielectric breakdown voltage are particularly costly.

Figure 8:
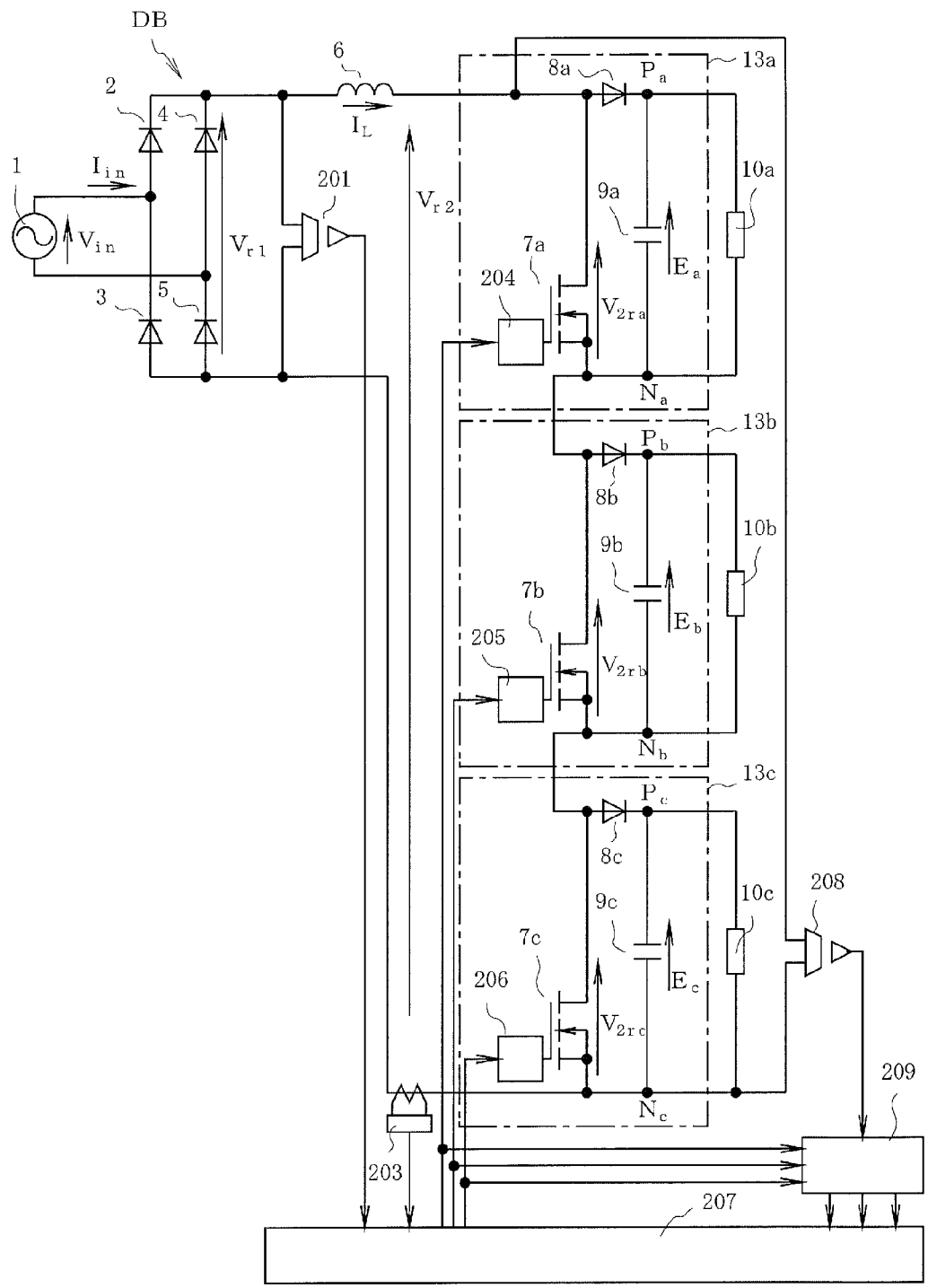
FIG. 8 is a circuit diagram showing Embodiment 7 of the present invention.

FIG. 8 is a circuit diagram showing Embodiment 7 for solving the problem described above. In FIG. 8, those parts having identical functions as those of FIG. 7 are given identical reference characters.

In Embodiment 7, one unit of an isolated amplifier 208 is connected between the point connecting an inductor 6 and a switching unit 13a and a DC mother line on the negative side of a switching unit 13c, as shown in FIG. 8. Regardless of the number of switching units connected in series, the isolated amplifier 208 detects only the total voltage of the circuits of the switching units connected in series, or, in other words, a voltage $V_{r2}$, and transmits the detected value to an output voltage identifying circuit 209.

The output voltage identifying circuit 209 is a circuit that identifies the individual output voltages $E_a$, $E_b$, and $E_c$ of switching units 13a, 13b, and 13c from the detected value of the voltage $V_{r2}$. Principles employed by the output voltage identifying circuit 209 for identification will be described below.

As shown in FIG. 4, the voltage $V_{r2}$ is a value obtained by adding the voltages $V_{r2a}$, $V_{r2b}$, and $V_{r2c}$ ($E_a$, $E_b$, and $E_c$) of the switching units 13a, 13b, and 13c. When the switching device 7a changes from "on" to "off" in FIG. 8, for example, the voltage $E_a$ changes in a step-like manner.

Therefore, if a difference in the voltage $V_{r2}$ recorded before and after the switching of the switching device 7a is detected, it is possible to know the value of the $E_a$. The same applies to the relationship between the switching device 7b and the voltage $E_b$, and the relationship between the switching device 7c and the voltage E.

In other words, the output voltage identifying circuit 209 can identify the output voltages $E_a$, $E_b$, and $E_c$ of the switching units 13a, 13b, and 13c solely based on a detected value of the voltage $V_{r2}$.

The identification principles described above are based on the fact that it is possible to easily identify which of the switching devices has caused a change in voltage, since the switching timings of the switching devices 7a, 7b, and 7c are staggered from one another by causing the phases of carriers a, b, and c to be different from one another, as shown in FIG. 4.

By referring to the on-off signals of the switching devices 7a, 7b, and 7c inputted by the control device 207, the output voltage identifying circuit 209 attributes a change in the voltage $V_{r2}$ to one of the output voltages $E_a$, $E_b$, and $E_c$ of the switching units 13a, 13b, and 13c, and makes a record. The output voltages $E_a$, $E_b$, and $E_c$ are updated after every switching of each of the switching devices 7a, 7b, and 7c. Here, the switching frequency is sufficiently higher than the frequency of the AC power source 1. Therefore, it is possible to detect and update the output voltages $E_a$, $E_b$, and $E_c$ in a sufficiently short interval.

Figure 9:
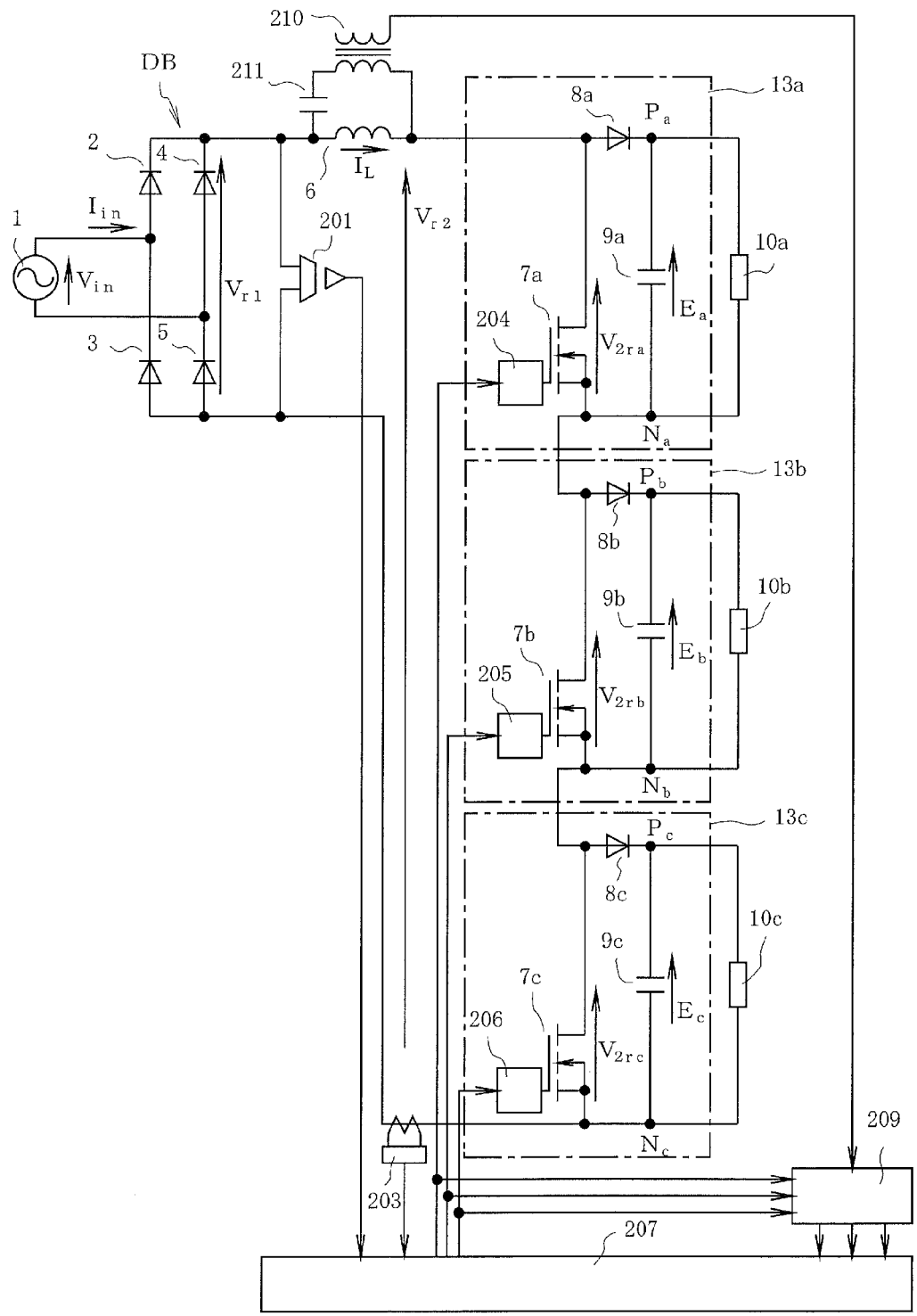
FIG. 9 is a circuit diagram showing Embodiment 8 of the present invention.

Next, FIG. 9 is a circuit diagram showing Embodiment 8 of the present invention. In FIG. 9, those parts having identical functions as those of FIGS. 7 and 8 are given identical reference characters.

The change in a voltage $V_{r2}$ that occurs due to switching can also be detected at both ends of an inductor 6. Embodiment 8 focuses on this point.

At both ends of the inductor 6 in FIG. 9, voltages with roughly three types of frequency components are found: a very small level of a DC voltage component attributed to coil resistance; low-frequency components; and high frequency components that have a switching frequency or higher. Since only a change in the voltage $V_{r2}$ at the time of switching needs to be captured accurately here, there is no need to detect low-frequency components, and therefore no need to employ an isolated amplifier. For this reason, a high-frequency transformer 210, which is less costly than an isolated amplifier, is used here to detect a change in the voltage $V_{r2}$ from the switching frequency component of a terminal voltage across the inductor 6. Here, the high-frequency transformer 210 functions as an inductor voltage detector.

A primary winding of the high-frequency transformer 210 is connected to both ends of the inductor 6 via a low frequency blocking capacitor 211. The low frequency blocking capacitor 211 removes low-frequency components or a DC component of the voltage, which are unnecessary in the first place, and prevents the core of the transformer 210 from saturating when these components are applied to the primary winding.

A secondary winding of the high-frequency transformer 210 is connected to an output voltage identifying circuit 209. This makes it possible to attribute a change in the voltage $V_{r2}$ to one of output voltages $E_a$, $E_b$, and $E_c$ of switching units 13a, 13b, and 13c, in a manner similar to FIG. 8.

Here, in lieu of the high-frequency transformer 210, it is possible to provide a secondary winding to the inductor 6 so as to operate in the same manner as the high-frequency transformer 210. The same function can be achieved by inputting the voltage of the secondary winding into the output voltage identifying circuit 209, making it possible to further simplify the circuit configuration.

Even in cases where the inductor is to be divided into a plurality of inductors as shown in FIG. 5, the inductors are connected in series in the circuit. Therefore, provided that the inductance of each inductor is kept equal, the voltage applied to each inductor when there are n groups of switching units connected in series will be an equal value of 1/n of the total voltage, regardless of which switching device is switched. As a result, by detecting a voltage of one of the plurality of inductors using the high-frequency transformer 210, it is possible to detect the voltage using the same principles as those of FIG. 9.

Further, the terminal voltage across an inductor has the characteristic of being nearly proportional to a derivative of the current flowing through the inductor. Since the current flowing through the inductor is detected by the current detector 203, for example, it is possible to obtain a value proportional to the terminal voltage across the inductor from a derivative of the detected value of the current of the inductor. A differentiator that obtains a derivative of the detected value of the current of the inductor can be provided inside a control device 207, or outside the control device 207. An example of a method of providing the differentiator outside of the control device 207 includes a method by which an analog differential circuit is provided downstream of the current detector 203 to detect the output value thereof.

According to Embodiment 8, it is possible to eliminate the need for isolated voltage detectors such as the isolated amplifiers 202a, 202b, and 202c of FIG. 7 and the isolated amplifier 208 of FIG. 8 for detecting DC output voltages $E_a$, $E_b$, and $E_c$.

However, with the method of detecting a voltage using the high-frequency transformer 210 shown in FIG. 9, it is not possible to detect the DC output voltages $E_a$, $E_b$, and $E_c$ when the switching units 13a, 13b, and 13c are not performing switching, such as before the device starts up or while the device is restarting after shutting down.

An example of addressing these situations includes a method by which the control device 207 determines whether or not the main circuit is ready for switching operation by providing: a non-isolated voltage detector for the electrical potential of each of the switching units 13a, 13b, and 13c; a comparator that assesses whether each potential is within a normal range; and an isolated digital signal transmitter for transmitting a result of assessment by the comparator to the control device 207 in an isolated state. Additional components required for this method are far less costly than isolated amplifiers, which have a high voltage isolating capability.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An AC to DC converter, comprising:
a rectifier circuit that rectifies an AC voltage generated by an AC voltage source;
a plurality of switching units that collectively receive an output voltage of said rectifier circuit through an inductor, and that are connected in series at an input side, each of the switching units having a semiconductor switching device, a diode, and a capacitor, and performing ON/OFF switching of the semiconductor switching device provided therein to step up a voltage received from said rectifier circuit, each of the switching units supplying the stepped-up voltage to said capacitor through said diode so that a resulting DC across said capacitor can be provided, as a DC output voltage of the switching unit, to a respective load to be connected to terminals of said capacitor; and
a control device that performs pulse width modulation control on said semiconductor switching device to control said DC output voltage in each of the switching units, and that controls a waveform of an AC current flowing into said rectifier circuit from the AC voltage source so as to be a sinusoidal waveform,
wherein said control device comprises:
a pulse width correction unit that performs pulse width modulation control on the respective switching units such that, when the DC output voltage of one switching unit is lower than the DC output voltage of another switching unit, a conducting period of the diode in said one switching unit is caused to be longer than in said another switching unit, and such that when the direct current output voltage of said one switching unit is higher than the direct current output voltage of said another switching unit, the conducting period of the diode in said one switching unit is caused to be shorter than in said another switching unit.

2. The AC to DC converter according to claim 1, further comprising:
a plurality of isolated DC-DC converters respectively connected to the plurality of switching units, input terminals of each isolated DC-DC converter being connected in parallel to said capacitor of the corresponding switching unit, and being isolated from output terminals of the isolated DC-DC converter.

3. The AC to DC converter according to claim 2, wherein the output terminals of the isolated DC-DC converters are connected in parallel or in series.

4. The AC to DC converter according to claim 1, wherein said control device causes time differences in switching timing among the plurality of switching units.

5. The AC to DC converter according to claim 1,
wherein for each of the plurality of switching units, said control device compares a signal wave with a carrier to perform pulse width modulation control so as to generate a driving signal for the semiconductor switching device in the switching units, and
wherein said pulse width correction unit generates said signal wave separately for each of said plurality of switching units by multiplying a common signal wave with a value that is proportional to a reciprocal of the DC output voltage of the corresponding switching unit, or by adding the common signal wave to a value that is proportional to a value obtained by subtracting the DC output voltage of the corresponding switching unit from an average value of the DC output voltages of all of said switching units.

6. The AC to DC converter according to claim 1, further comprising:
a voltage detector that detects a terminal voltage across the plurality of switching units connected in series in the input side; and
an output voltage identifying circuit that, based on a change in the voltage detected by said voltage detector and a state of switching of said plurality of switching units, identifies which of the switching units has caused said change in the voltage across the plurality of switching units.

7. The AC to DC converter according to claim 1, further comprising:
an inductor voltage detector that detects a terminal voltage across said inductor; and
an output voltage identifying circuit that, based on a change in the voltage detected by said inductor voltage detector and a state of switching of said plurality of switching units, identifies which of the switching units has caused said change in the voltage across said inductor.

8. The AC to DC converter according to claim 7, wherein said inductor voltage detector is a transformer, a primary coil of said transformer being connected to said inductor in parallel and a secondary coil of said transformer being connected to said output voltage identifying circuit.

9. The AC to DC converter according to claim 7, wherein said inductor voltage detector is a detector that detects a derivative of a current flowing through said inductor.

* * * * *